United States Patent [19]
Sabater et al.

[11] 3,718,727
[45] Feb. 27, 1973

[54] STRETCHING FILM OF PARTIALLY CRYSTALLINE POLYMERS

[75] Inventors: Eudaldo Sabater, 6733 Hassloch; Lothar Schlemmer, 6701 Maxdorf, both of Germany

[73] Assignee: Badische Anilin-& Soda-Fabrik Aktiengesellschaft, Ludwigshafen/Rhein, Land Rheinland-Pfalz, Germany

[22] Filed: Oct. 5, 1970

[21] Appl. No.: 78,104

[52] U.S. Cl. .................................. 264/289, 264/288

[51] Int. Cl. .................................................. B29d 7/24

[58] Field of Search ........................ 264/210, 288, 289

[56] References Cited

UNITED STATES PATENTS

| | | | |
|---|---|---|---|
| 3,574,809 | 4/1971 | Fairbanks et al. | 264/289 |
| 3,517,098 | 6/1970 | Rasmussen | 264/288 |
| 3,257,488 | 6/1966 | Rasmussen | 264/289 |

*Primary Examiner*—Donald J. Arnold
*Assistant Examiner*—James B. Lowe
*Attorney*—Johnston, Root, O'Keeffe, Keil, Thompson & Shurtleff

[57] ABSTRACT

Manufacture of stretched film of partially crystalline polymers such as polyamides wherein preformed film is transversely stretched at a temperature of from 80° to 210°C after forming a groove along an edge in the machine direction of the film, the depth of the said groove being from more than one tenth up to thirty times the tolerance of thickness variation of the film.

5 Claims, 1 Drawing Figure

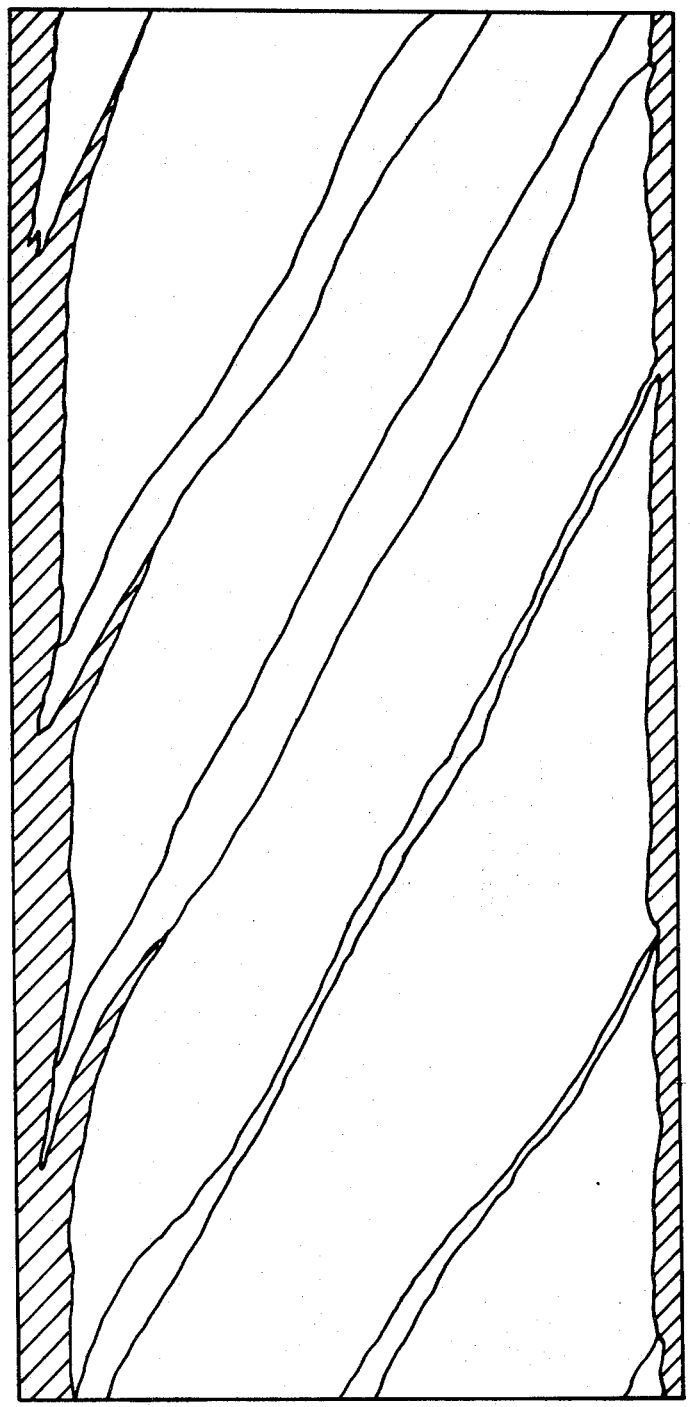

STRETCHING FILM OF PARTIALLY CRYSTALLINE POLYMERS

This invention relates to a method of stretching film of partially crystalline polymers in which a groove is formed in the film within the stretching area before stretching is carried out.

It is known to improve the properties of film of thermoplastic polymers by stretching or rolling out the film in one or both directions.

A number of known methods are described by J. Jack in British Plastics, 34, 312–318 and 391–394 (1961). These suffer from the drawback that the stretching of crystallizing thermoplastic film tends to produce stretching thereof in zones, particularly when film which has already been stretched "along" is subsequently stretched "across." This zoned stretching effect is particularly noticeable when stretching polyamides, which, as a result, cannot usually be stretched biaxially. With increasing crystallinity and increasing variations in the thickness of the film there is an increased tendency for the film to stretch unevenly thereby forming adjacent areas of different degrees of orientation (necking). With various polymers, for example polypropylene, this tendency is counteracted by using high stretch ratios at very accurately controlled temperatures just below the crystallite melting point. In the case of polyamide film, necking is greatly influenced by the type of crystalline structure present. The blocking type of crystalline structure responsible for necking is particularly marked when "across" stretching has been previously effected. The accompanying drawing illustrates biaxially stretched, "zoned" thermoplastic film showing its marked surface texture. The edges of the film along its machine direction are intentionally made thicker to accomodate the clamps used for gripping the film, particularly during stretching in the transverse direction.

French Pat. No. 1,466,715 describes a method of stretching polyamide film in both directions simultaneously. The method can only be carried out on a highly complicated machine whose limited range of application makes the method too expensive for commercial application. Another drawback of this method, as compared with a two-stage method, is that unstretched or irregularly stretched, broad marginal areas are produced which constitute an important wastage factor.

The said method may only be carried out satisfactorily when a starting film is used which is free of stripes and flaws and is of very even thickness, in which case the standard of extrusion has to satisfy extremely stringent requirements.

It is an object of the present invention to provide a simple method of stretching film of partially crystalline polymers without difficulty and without the appearance of texture, which film may show differences of thickness before stretching. It is a further object of the invention to provide stretched film showing optical surface uniformity, which film has been prepared from film showing the normal thickness variations obtained in conventional extrusion techniques. Yet another object of the invention is to provide stretched film in which the unstretched or irregularly stretched marginal regions are very narrow such that wastage is kept down to a minimum.

We have found that it is possible to stretch film of partially crystalline polymers, particularly polyamides, transversely or both longitudinally and transversely without the aforementioned drawbacks, when at least one groove is formed in the machine direction of the film within the stretching area either before the film is stretched or after it has been stretched in the machine direction, the depth of the groove being more than one tenth of the tolerance of thickness variation of the film to be stretched the film then being stretched by any conventional technique.

By partially crystalline polymers which are suitable for producing film that may be satisfactorily stretched by the method of the invention we mean those having a degree of crystallinity of from 1 to 70 percent, preferably from 10 to 50 percent. Such polymers include polyamides having repeating amide groups in the backbone of the molecule and also, in particular, saturated polyesters having repeating ester groups in the backbone of the molecule, polyvinylidene chloride and substantially isotactic polypropylene. The best results are obtained by using film of polyamides, such as polylactams, for example polycaprolactam, polycapryllactam, polylauryllactam or polyenantholactam, polyamide 6,6, polyamide 6,10, polyamide 6,12 or poly-11-amino undecanoic acid, and also copolymers of the starting materials on which these polyamides are based or mixtures of such polyamides. The mean molecular weight of these polyamides is preferably from about 15,000 to 50,000 equivalent to a relative viscosity of 2.5 to 5.2, as measured on a 1 percent w/w solution in concentrated sulfuric acid at 25°C (for literature see W.N. Dawidoff: Bestimmung des Molekulargewichts von Polyamiden, 2nd Edition, Berlin 1959).

In the method of the present invention, according to which film made of partially crystalline polymers and showing thickness variations may be stretched without the appearance of surface texture, a groove is formed in the starting film or in the film after it has been stretched "along," which groove is located in the stretching area of the film and preferably extends in the machine direction. In this way the point in the film at which stretching commences, on application of the stretching forces, is defined by the groove, and consequently only one such starting point is produced. This avoids the formation of surface texture. Partially crystalline film may be biaxially stretched by this method using conventional equipment.

By the term groove, as used in the present specification, we mean any abrupt depression formed in the film and extending in substantially one direction. The depression may have any desired cross-section, for example it may have a semi-circular, rectangular, U-shaped or V-shaped cross-section. We particularly prefer to use a V-shaped groove whose sides form an acute angle. The groove may be formed by scratching the surface of the film with a sharp or pointed article or by embossing the film between squeeze-rollers of by calendering. It may also be formed during extrusion of the film by using a die of appropriate shape. It may be formed in one or both sides of the film. In addition to the mechanical methods, there are thermal methods of forming the desired groove, for example it may be locally melted by the use of a hot edge (soldering iron), or it may be produced electrically, for example by engraving the sheet with electrodes. Optimum width and depth of the groove depend on the degree of crystallinity and on the thickness variations of the film. In the case of film showing a high degree of crystallinity or marked thickness variations the grooves must be deeper than in film substantially comprising amorphous material or of uniform thickness, to achieve the same results. The depth of the groove must be greater than one tenth of the tolerance of thickness variation of the film being drawn, and by tolerance we mean the maximum permissible deviation from the average film thickness. The depth of the groove must be more than one tenth of the said tolerance and not more than thirty times the tolerance and is preferably equal to one to ten times the tolerance, the depth being measured from that level which corresponds to the surface of the film at a point of average thickness. The tolerance of thickness variation is generally not more than 10 percent of the thickness of the film and is usually between 2 and 5 percent thereof.

The groove may be formed in any desired position in the film. If the groove is provided by means of a pointed pin or other means such that it forms, for example, a wavy line on the film, then the film will commence stretching at the wavy line thus formed. It is particularly convenient to form the groove in the machine direction of the film. We prefer to place the groove parallel to the edge of the film near the clamps, that is, at a distance from the edge of from 0.5 to 3 cm, preferably from 0.8 to 1.5 cm. With this arrangement, virtually no stretching takes place in the film on the side of the groove near the clamps, such stretching, if any, being limited to a narrow strip along the row of clamps, that is, along the edge of the film. In this way it is possible to locate the mark which indicate where the film commenced stretching and is visible in the stretched film and which corresponds to the groove formed in the film, so near to the edge of the film that it will be removed during trimming of the film and is no cause of additional wastage. There is thus produced a stretched film of uniform thickness and without any visible stretch mark. The surface of the film appears uniform to the eye.

The film is stretched by conventional techniques, such as are described in International Engineering, 1963, pp. 131–136, and Verpackungsrundschau, 1965, pp. 1559–1566, or U.K. Pat. No. 743,503. It is carried out at temperatures ranging from 80° to 210°C, the temperature being chosen according to the type of polymeric material of which the film consists, the preferred range being from 120° to 200°C.

The method of the invention is equally suitable for stretching film across only or both along and across concurrently or successively in either order.

EXAMPLE

A partially crystalline film (degree of crystallinity approximately 40 percent), which has been stored under normal conditions for 2 months and then stretched "along" at a stretch ratio of 3, and which has a density of 1.138 g/cm$^3$ and a thickness of 0.07 mm (tolerance ± 0.005 mm) and is made of poly-6-caproamide (polyamide 6) having a relative viscosity of 4.0 as measured at 25°C in 96 percent sulfuric acid, is provided with a groove in its machine direction.

The groove is provided in any one of the surfaces of the film, 1 cm from the clamping means, by means of a rotatably mounted, weighted steel point (diameter 5 mm) contacting the surface of the film at an angle of 45° and producing in the film a depression having a width of from 0.8 to 0.9 mm and a depth of from 0.03 to 0.04 mm.

The resulting grooved film (measuring approximately 100 m in length and 27 cm in width) is then stretched "across" in known manner at a stretch ratio of 4. This is effected by first passing the film at a speed of 10 m/min. through an air-heated preheating zone of 3 m in length and at a temperature of 115°C and then stretching the preheated film "across" at 175°C during a period of 30 seconds and finally cooling the film in a cooling zone by means of cold air to produce a shrinkage in the transverse direction of 8 percent. The film is then continuously trimmed at both edges by means of knives provided above and below the film.

The resulting biaxially stretched film is free of texture, as may be seen from the accompanying drawing, which shows that no zoned stretching has taken place during the entire stretching operation.

By way of comparison a further 100 m of the same "along" oriented film is stretched "across" under the same conditions but without the provision of a groove. Over 40 different zones and almost double that amount of texture lines were counted.

What we claim is:

1. In a method of stretching, in the transverse direction or in both the transverse and machine directions, a film of a partially crystalline polyamide having repeating carbon amide groups in the backbone and a mean molecular weight of from approximately 15,000 to 50,000, wherein the film is held by clamping means along its edges in the machine direction during transverse stretching, the improvement which comprises forming a single groove extending longitudinally along an edge in the machine direction of the film and within the stretching area of the film as close to the clamping means as possible, said groove being made either before the film is stretched or after it has been stretched in the machine direction, the depth of the groove being more than one tenth up to not more than thirty times the tolerance of thickness variation of the film being stretched, said tolerance being not more than 10% of the thickness of the film, and then transversely stretching the film at temperatures ranging from 80° to 210°C. to produce a stretched film of uniform thickness.

2. A method as claimed in claim 1, wherein the film is stretched in both the machine and transverse directions successively and the groove is formed after stretching in the machine direction but before stretching in the transverse direction.

3. A method as claimed in claim 1 wherein the depth of said groove is about one to ten times the tolerance of thickness variation of the film being stretched.

4. A method as claimed in claim 3 wherein the tolerance of thickness variation is not more than about 2 to 5 percent of the thickness of the film.

5. A method as claimed in claim 1 wherein said stretching of the film is carried out at temperatures of 120°C. to 200°C.

* * * * *